V. A. FYNN.
SINGLE PHASE COMMUTATOR MOTOR.
APPLICATION FILED MAR. 3, 1906.
928,438.
Patented July 20, 190
FIG. 1.
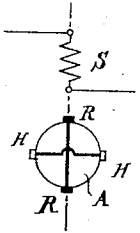
FIG. 2.
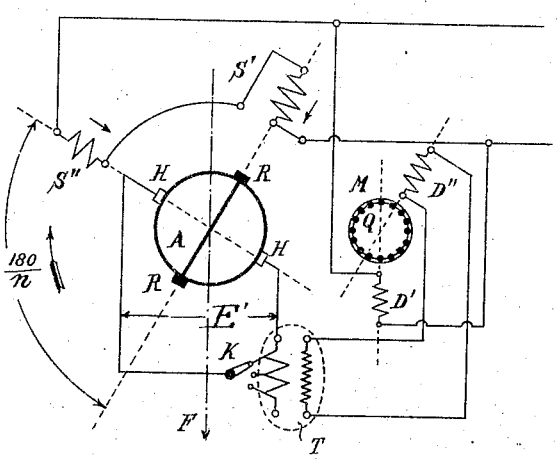
FIG. 3.
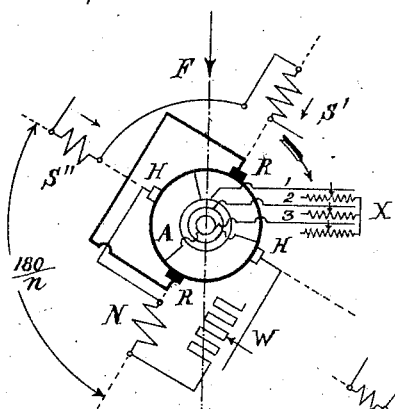
FIG. 4.
FIG. 5.
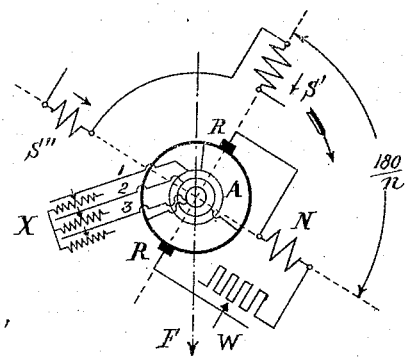
FIG. 6.
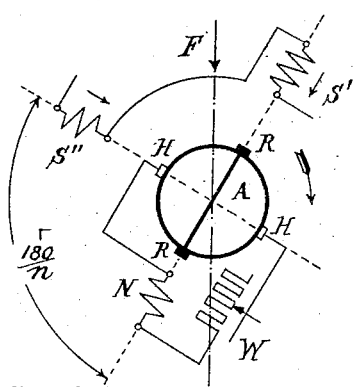
FIG. 7.
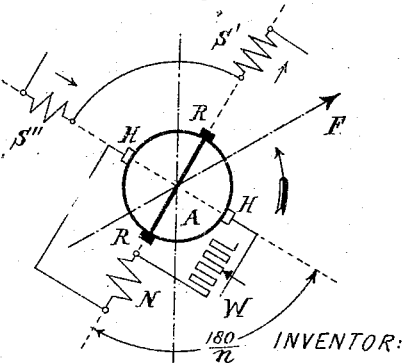
WITNESSES:
Fred White
René Ruine
INVENTOR:
Valere Alfred Fynn
By his Attorneys

UNITED STATES PATENT OFFICE.

VALÈRE ALFRED FYNN, OF BLACKHEATH, LONDON, ENGLAND.

SINGLE-PHASE COMMUTATOR-MOTOR.

No. 928,438.   Specification of Letters Patent.   Patented July 20, 1909.

Application filed March 3, 1906. Serial No. 303,994.

*To all whom it may concern:*

Be it known that I, VALÈRE ALFRED FYNN, of 18 Blessington road, Blackheath, in the county of London, England, electrical engineer, have invented certain new and useful Improvements in Single-Phase Commutator-Motors, of which the following is a specification.

The present invention relates to single-phase commutator motors which can start as repulsion motors and operate as induction motors, and the power factor and torque of which are improved by impressing on the rotor an auxiliary E. M. F. of suitable phase. It therefore refers to motors combining the constructive elements of a repulsion motor with the constructive elements of a non-synchronous induction motor, and having alternating current supplied to the rotor by way of the commutator as described and claimed in my American Patent No. 777,198. Among other things it was shown in the patent referred to that the auxiliary E. M. F. required could be obtained from an auxiliary winding disposed on the stator. This means for obtaining the auxiliary E. M. F. is by far the most convenient but it entails certain disadvantages to remove which is the object of this invention. Thus in order to reverse the direction of rotation of such a compensated shunt induction motor it would be necessary either to use an inefficient stator winding (such as a distributed one) or to provide two main stator windings one of which would always remain idle. The brushes could also be shifted for the purpose of reversing the direction of rotation but this would be very objectionable in practice and would in addition necessitate two auxiliary stator windings in case the auxiliary E. M. F. was derived from an auxiliary stator winding.

By the present invention these disadvantages are obviated by suitably combining with the said type of motor an efficient main stator winding divided into two parts displaced with regard to each other. These parts are so displaced and so connected that the direction of rotation can be reversed by reversing the current in one or more parts of the stator winding, whereby the same auxiliary winding can be made use of for both directions of rotation. One part of the stator winding is therefore according to this invention preferably placed coaxially with the "repulsion brushes", or those which are used for starting the machine, and the other part of the stator winding is preferably displaced with respect to the first by $180/n$ degrees. Throughout this specification $n$ stands for the number of poles. When the auxiliary E. M. F. is to be derived from the motor itself then the auxiliary winding from which this E. M. F. is derived is preferably disposed coaxially with one or the other of the two parts of the divided stator winding. This combination of elements produces a motor which can start with a powerful torque in the one or other direction, can operate with a nearly constant speed while running in the one or other direction, can be compensated to any desired extent when running in either direction while using stator windings of the most efficient type and while avoiding all idle windings in the machine.

The accompanying drawings represent diagrammatically a number of examples illustrating the nature of the invention.

In all cases 2 pole motors have been chosen as examples, but all the combinations illustrated can be applied without difficulty to multipolar motors. In all cases the rotor A (the armature) is supposed to be provided with a Gramme ring winding and the brushes are supposed to rest directly on the winding.

Figure 1 shows the known primary form of the single-phase shunt induction motor, the characteristics of the shunt induction motor are imparted to the machine by the fact that the armature is shortcircuited by way of the commutator and along the stationary axes passing through R R and H H. Fig. 2 shows a single-phase shunt induction motor possessing the features of this invention and the auxiliary E. M. F. for which is derived from an outside source. Fig. 3 shows a single-phase shunt induction motor possessing the features of this invention, the auxiliary E. M. F. for which is derived from a winding disposed on the stator and to which the characteristic of a shunt induction motor is imparted not only by means of the stationary short circuits R R and H H but also by the fact that several points of the rotor winding are shortcircuited independently of the commutator. Fig. 4 shows a motor similar to that shown in Fig. 3 but where the rotor carries two windings, one of these being connected to the commutator and the other being adapted to be shortcircuited. Fig. 5 shows a motor possessing the features of this invention and to which a shunt induction characteristic is imparted only by the fact that a number of rotor points are adapted to be shortcircuited independently of the commutator. Figs. 6 and 7 show a motor similar to that illustrated in Fig. 2 but where the auxiliary E. M. F. is derived from the motor itself and these figures particularly illustrate the mode of connecting up the machine for running in the one or the other direction.

Before beginning the description of the several examples given it will be well to give a short theory of the shunt induction motor to which these improvements refer.

As soon as an asynchronous single-phase induction motor provided with a squirrel cage rotor has attained a sufficiently high number of revolutions, a (second or) secondary field is set up in this motor by rotation, which field is displaced in phase and space by about 90 degrees with regard to the primary field due to the stator. But the single-phase induction motor with squirrel cage is only a special case of the primary form of the single-phase induction motor; this comprises, as is well known, a direct current armature which (for a 2-pole motor) is short-circuited along two axes stationary in space and perpendicular to each other as is shown diagrammatically in Fig. 1. By shortcircuiting the rotor along more and more axes one finally arrives at a totally short-circuited rotor in which the commutator can be dispensed with and one practical form of which is known as the squirrel cage rotor. If one of these axes, for instance that passing through the brushes R coincides with the stator field axis then the secondary field set up by rotation will be perpendicular to the primary field and will coincide with the axis of the brushes H, the motor will then operate as a pure induction motor. If neither of the two axes coincide with the primary field, then a secondary field will still be set up by rotation and the motor will not only operate as an induction motor but also partly as a repulsion motor. The two fields existing in such a motor are as regards phase displaced with regard to each other by practically 90 degrees. Now since a field always induces in a winding placed therein an E. M. F. which lags by 90 degrees behind that field then in this case the primary field will induce in a winding coaxial with it an E. M. F. which is cophasal with the other, or secondary field, induced in the motor by rotation and vice versa. In case then that the auxiliary E. M. F. is to be obtained from the motor itself, the auxiliary winding is always to be disposed (for the two pole motor shown in Fig. 1) approximately in that field which is perpendicular to the one along the axis of which the auxiliary E. M. F. is to be impressed.

It may be stated generally that in order to compensate the motor (i. e. improve its power factor) with the least expenditure of energy, the auxiliary E. M. F. to be impressed on the rotor by way of the commutator should coincide in phase as nearly as possible with that field which traverses the rotor in normal operation (before the auxiliary E. M. F. has been applied) approximately along that axis or direction along which the said auxiliary E. M. F. is to be impressed. The phase of this auxiliary E. M. F. may also be defined by saying that it should be of approximately the same phase as that E. M. F. which is generated in the rotor by rotation and at those points of the rotor winding (or commutator) at which the auxiliary E. M. F. is applied. It is then to be understood that the rotor E. M. F. referred to is generated by rotation in that leakage field the axis of which is approximately at right angles to the axis along which the auxiliary E. M. F. is impressed.

The motor shown in Fig. 2 comprises a stator winding divided into two groups S' and S'' displaced by $180/n$ degrees also a rotor provided with a winding connected to a commutator on which are disposed two sets of brushes. The one set R R is adapted to be directly short-circuited and is placed coaxially with the stator group S' which contains the greatest number of turns. The other set of brushes H H is displaced by $180/n$ degrees with regard to R R and adapted to receive the auxiliary E. M. F. (E') which in this case is derived from an outside source M and impressed on the brushes H H by way of the transformer T which can be regulated by the switch K.

In order to start the motor the circuit of the brushes H H is opened or the auxiliary E. M. F. chosen relatively high. When up to speed this brush circuit is closed and the magnitude of the auxiliary E. M. F. is adjusted so as to give the required value of $\cos \varphi$ i. e. of the power factor. The proportion of the turns in the stator windings S' and S'' determines the starting torque. The relative direction of the current through these two windings determined the direction of rotation. The auxiliary E. M. F. is here derived by way of example from an ordinary asynchronous single-phase motor M with a squirrel cage rotor Q. The stator of M carries two windings D' and D'', the winding D' is connected in parallel to the mains, the winding D'' is displaced with regard to the first so as to yield an auxiliary E. M. F. as nearly as possible in phase with the secondary field of the motor or that field which is set up in the motor by rotation and which threads the rotor approximately in the direction of the brushes H H or in that direction in which the auxiliary E. M. F. is to be applied. After the motor has reached its full speed, all the brushes may be so displaced as to bring the short-circuited brushes R R into coincidence with the axis F of total magnetization produced by the stator windings. The auxiliary E. M. F. (E') when applied to the brushes H H may have the same phase as that of the E. M. F. supply.

The motor shown in Fig. 3 comprises the same elements as that shown in Fig. 2. The auxiliary E. M. F. applied to the brushes H H is however derived from an auxiliary winding N disposed on the stator and displaced by 180/n degrees with respect to the brushes H H to which the auxiliary E. M. F. is applied. A resistance W is here provided by way of example in order to regulate the auxiliary E. M. F. If it is desired to close the H H circuit already at starting then the resistance must be chosen high and diminished with increasing speed. In addition an arrangement is provided for shortcircuiting a number of points of the rotor winding independently of the commutator. For this purpose three slip rings, 1, 2, 3 are fitted to the rotor and connected to the rotor winding. Three slip rings can be shortcircuited gradually over the resistances X as shown in Fig. 3. These slip rings are shortcircuited preferably when the motor has reached its normal speed.

The motor shown in Fig. 4 comprises the same elements as that shown in Fig. 3. The auxiliary E. M. F. is however applied to those brushes R R which are used for starting and is derived from an auxiliary winding N disposed on the stator and the axis of which is displaced by 180/n degrees with respect to the axis through the brushes R R. The rotor carries two windings by way of example, the one b connected to the commutator, the other c adapted to be shortcircuited at the points 1, 2, 3. Means for shortcircuiting these points are not shown so as not to complicate the figure. Any known means may be used, for instance those shown in Fig. 3. When starting the motor the brush circuit H H is left open at the switch P and the brushes R R shortcircuited by means of switch K or closed on the auxiliary winding N. When up to speed P is closed and K is adjusted so as to obtain the desired power factor. It may be stated as a guide to the choice of the phase of the auxiliary E. M. F. when applied to the brushes R R that it should be approximately in quadrature with the phase of the E. M. F. applied to the main stator winding.

The motor shown in Fig. 5 comprises the same elements as in the previous example with the exception however of the brushes H H which in this case have been left out. When these brushes are not used to convey the auxiliary E. M. F. into the rotor and when means are provided for shortcircuiting a rotor winding independently of the commutator then these brushes can be discarded without robbing the motor of its shunt induction characteristics. In Fig. 5 the means for shortcircuiting a rotor winding independently of the commutator are the same as shown in Fig. 3. For the purpose of regulating the circuit comprising the brushes R R a resistance is provided at W.

Figs. 6 and 7 show motors identical in every respect with that illustrated by Fig. 3 with the exception however that no means are provided for shortcircuiting a rotor winding independently of the commutator. These two figures illustrate the change of connections required in the stator windings in order to reverse the direction of rotation of the motor.

What I claim and desire to secure by Letters Patent is:—

1. In a single-phase commutator motor, an inducing member, a main winding on the inducing member consisting of two parts displaced by 180/n degrees and connected in series relation, an auxiliary winding on the inducing member, an induced member, means for introducing into the induced member an auxiliary E. M. F. derived from said auxiliary winding and means for short-circuiting the induced member along at least one axis.

2. In a single-phase commutator motor, an inducing member, a main winding on the inducing member consisting of two parts displaced by 180/n degrees and connected in series relation, an auxiliary winding on the inducing member coaxially disposed with reference to one part of the said main winding, an induced member, means for introducing into the induced member an auxiliary E. M. F. derived from said auxiliary winding and means for short-circuiting the induced member along at least one axis.

3. In a single-phase commutator motor, an inducing member, a main winding on the inducing member consisting of two parts displaced by 180/n degrees and connected in series relation, an auxiliary winding on the inducing member coaxially disposed with one part of the said main winding, an induced member, means for introducing into the induced member along an axis displaced by 180/n degrees with respect to the axis of said auxiliary winding an auxiliary E. M. F. derived from said auxiliary winding and means for short-circuiting the induced member along at least one axis.

4. In a single-phase commutator motor, an inducing member, a main winding on the inducing member consisting of two parts displaced by 180/n degrees and connected in series relation, an auxiliary winding on the inducing member coaxially disposed with one part of the said main winding, an induced member, means for introducing into the induced member along an axis displaced by 180/n degrees with respect to the axis of said auxiliary winding an auxiliary E. M. F. derived from said auxiliary winding and means for short-circuiting the induced member along an axis coinciding with that of the said auxiliary winding.

5. A single-phase commutator motor comprising the combination of a stator, a main winding on the stator divided into two parts connected in series relation and displaced by $180/n$ degrees with respect to each other, an auxiliary winding on the stator, a rotor, a commutator, two sets of brushes on the commutator, means for short-circuiting one set of brushes, and means for connecting the other set of brushes to said auxiliary winding.

6. A single-phase commutator motor comprising the combination of a stator, a main winding on the stator divided into two parts connected in series relation and displaced by $180/n$ degrees, an auxiliary winding on the stator coaxially disposed with reference to one part of the main stator winding, a rotor, a commutator, two sets of brushes on the commutator displaced by $180/n$ degrees, means for short-circuiting one set of brushes and means for connecting the other set of brushes to said auxiliary winding.

7. A single-phase commutator motor comprising the combination of a stator, a main winding on the stator divided into two parts connected in series relation and displaced by $180/n$ degrees, an auxiliary winding on the stator coaxially disposed with one part of the main stator winding, a rotor, a commutator, two sets of brushes on the commutator one set being coaxially disposed with the auxiliary stator winding and displaced by $180/n$ degrees with respect to the other set of brushes, means for short-circuiting that set of brushes which is coaxially disposed with said auxiliary winding, and means for connecting the other set to this auxiliary winding.

8. A single-phase commutator motor comprising the combination of a stator, a main winding on the stator divided into two parts connected in series relation and displaced by $180/n$ degrees, an auxiliary winding on the stator, a rotor, a commutator, two sets of brushes on the commutator, means for short-circuiting one set of brushes, means for connecting the other set of brushes to said auxiliary winding and means for short-circuiting a number of points of the rotor windings independently of the commutator.

9. A single-phase commutator motor comprising the combination of a stator, a main winding on the stator divided into two parts connected in series relation and displaced by $180/n$ degrees, an auxiliary winding on the stator coaxially disposed with one part of the main stator winding, a rotor, a commutator two sets of brushes on the commutator one set being coaxially disposed with the auxiliary stator winding and displaced by $180/n$ degrees with respect to the other set of brushes, means for short-circuiting that set of brushes which is coaxially disposed with said auxiliary winding, means for connecting the other set of brushes to said auxiliary winding and means for short-circuiting a number of points of the rotor windings independently of the commutator.

In witness whereof, I have hereunto signed my name in the presence of two subscribing witnesses.

VALÈRE ALFRED FYNN.

Witnesses:
ROBERT M. SPEARPOINT,
H. D. JAMESON.